United States Patent
Lee et al.

(10) Patent No.: US 12,516,161 B2
(45) Date of Patent: Jan. 6, 2026

(54) SUPER ABSORBENT POLYMER AND PREPARATION METHOD THEREOF

(71) Applicant: LG Chem, Ltd., Seoul (KR)

(72) Inventors: Hyemin Lee, Daejeon (KR); Jungmin Sohn, Daejeon (KR); Jihye Ryu, Daejeon (KR); Chang Hun Han, Daejeon (KR); Taebin Ahn, Daejeon (KR)

(73) Assignee: LG Chem, Ltd., Seoul (KR)

( * ) Notice: Subject to any disclaimer, the term of this patent is extended or adjusted under 35 U.S.C. 154(b) by 321 days.

(21) Appl. No.: 18/027,543

(22) PCT Filed: Dec. 17, 2021

(86) PCT No.: PCT/KR2021/019247
§ 371 (c)(1),
(2) Date: Mar. 21, 2023

(87) PCT Pub. No.: WO2022/131837
PCT Pub. Date: Jun. 23, 2022

(65) Prior Publication Data
US 2024/0247110 A1    Jul. 25, 2024

(30) Foreign Application Priority Data

Dec. 18, 2020 (KR) .................. 10-2020-0178428
Dec. 16, 2021 (KR) .................. 10-2021-0180575

(51) Int. Cl.
| | | |
|---|---|---|
| *C08F 20/06* | (2006.01) | |
| *C08J 3/00* | (2006.01) | |
| *C08J 3/075* | (2006.01) | |
| *C08J 3/12* | (2006.01) | |
| *C08J 3/24* | (2006.01) | |
| *C08J 9/12* | (2006.01) | |
| *C08K 3/26* | (2006.01) | |
| *C08K 3/36* | (2006.01) | |
| *C08K 5/00* | (2006.01) | |
| *C08K 5/098* | (2006.01) | |

(52) U.S. Cl.
CPC .............. *C08J 3/075* (2013.01); *C08J 3/12* (2013.01); *C08J 3/245* (2013.01); *C08J 9/122* (2013.01); *C08K 3/36* (2013.01); *C08K 5/0025* (2013.01); *C08K 5/098* (2013.01); *C08J 2201/026* (2013.01); *C08J 2205/022* (2013.01); *C08J 2205/044* (2013.01); *C08J 2333/02* (2013.01)

(58) Field of Classification Search
None
See application file for complete search history.

(56) References Cited

U.S. PATENT DOCUMENTS

| | | |
|---|---|---|
| 5,985,944 A | 11/1999 | Ishizaki et al. |
| 6,107,358 A | 8/2000 | Harada et al. |
| 6,251,960 B1 | 6/2001 | Ishizaki et al. |
| 7,282,262 B2 | 10/2007 | Adachi et al. |
| 2005/0118423 A1 | 6/2005 | Adachi et al. |
| 2007/0066167 A1 | 3/2007 | Wada et al. |
| 2008/0269372 A1 | 10/2008 | Dairoku et al. |
| 2009/0239995 A1 | 9/2009 | Bub et al. |
| 2011/0238026 A1 | 9/2011 | Zhang et al. |
| 2011/0301560 A1 | 12/2011 | Fujimura et al. |
| 2011/0313113 A1 | 12/2011 | Sakamoto et al. |
| 2012/0001122 A1 | 1/2012 | Wattebled et al. |
| 2012/0184670 A1 | 7/2012 | Kobayashi et al. |
| 2012/0184684 A1 | 7/2012 | Funk et al. |
| 2012/0258851 A1 | 10/2012 | Nakatsuru et al. |
| 2013/0158495 A1 | 6/2013 | Handa et al. |
| 2015/0011388 A1 | 1/2015 | Matsumoto et al. |
| 2015/0093575 A1 | 4/2015 | Naumann et al. |
| 2015/0129799 A1 | 5/2015 | Kobayashi et al. |
| 2015/0157759 A1 | 6/2015 | Azad et al. |
| 2015/0299404 A1 | 10/2015 | Daniel et al. |
| 2016/0280825 A1 | 9/2016 | Bauer et al. |
| 2016/0354757 A1 | 12/2016 | Lee et al. |
| 2016/0375171 A1 | 12/2016 | Omori et al. |
| 2018/0037686 A1 | 2/2018 | Lee et al. |
| 2018/0194904 A1 | 7/2018 | Lee et al. |
| 2018/0318793 A1 | 11/2018 | Yoon et al. |
| 2019/0085104 A1 | 3/2019 | Yoon et al. |
| 2019/0119452 A1 | 4/2019 | Yoon et al. |

(Continued)

FOREIGN PATENT DOCUMENTS

| | | |
|---|---|---|
| AU | 2004209957 B2 | 6/2006 |
| CN | 1140458 A | 1/1997 |

(Continued)

OTHER PUBLICATIONS

Elvers, B. et al.,"Ullmann's Encyclopedia of Industrial Chemistry" Fifth, Completely Revised Edition, vol. A 16, Jan. 1990, pp. 361-374.
Third Party Observation for application No. 21907141.2, dated Jul. 10, 2024, pp. 1-9.
Extended European Search Report for Application No. 21907139.6 dated Jan. 23, 2024. 15 pgs.
Extended European Search Report for Application No. 21907138.8 dated Jan. 11, 2024. 17 pgs.
Extended European Search Report for Application No. 21907141.2 dated Jan. 16, 2024. 21 pgs.
Catalog of "Aqua Keep" from Sumitomo Seika Chemicals, Super Absorbent Polymers, 15 pages.

(Continued)

*Primary Examiner* — Melissa A Rioja
(74) *Attorney, Agent, or Firm* — Lerner David LLP

(57) ABSTRACT

The present disclosure relates to a super absorbent polymer and a method for preparing the same. More specifically, it relates to a super absorbent polymer including a plurality of micropores, specifically an average of 7 or more micropores per particle, having an average diameter of 100 μm or less and a maximum diameter of 300 μm or less, and thus exhibiting an improved absorption rate and a high surface (Continued)

tension, and a method for preparing the super absorbent polymer.

20 Claims, 2 Drawing Sheets

(56) References Cited

U.S. PATENT DOCUMENTS

| | | |
|---|---|---|
| 2019/0217272 A1 | 7/2019 | Hong et al. |
| 2019/0344243 A1 | 11/2019 | Lee et al. |
| 2020/0188876 A1 | 6/2020 | Kim et al. |
| 2021/0009725 A1 | 1/2021 | Nam et al. |
| 2021/0023529 A1 | 1/2021 | Lee et al. |
| 2021/0069674 A1 | 3/2021 | Jung et al. |
| 2021/0146336 A1 | 5/2021 | Kim et al. |
| 2021/0169709 A1 | 6/2021 | Bauer et al. |
| 2021/0230377 A1 | 7/2021 | Lee et al. |
| 2021/0309777 A1 | 10/2021 | Lee et al. |
| 2022/0016599 A1 | 1/2022 | Lee et al. |
| 2022/0071818 A9 | 3/2022 | Bauer et al. |
| 2023/0331933 A1 | 10/2023 | Sohn et al. |
| 2023/0347317 A1 | 11/2023 | Yoon et al. |
| 2023/0374232 A1* | 11/2023 | Ryu .................... C08J 3/245 |
| 2024/0018321 A1 | 1/2024 | Shin et al. |

FOREIGN PATENT DOCUMENTS

| | | |
|---|---|---|
| CN | 1179433 A | 4/1998 |
| CN | 1697859 A | 11/2005 |
| CN | 102317329 A | 1/2012 |
| CN | 102548654 A | 7/2012 |
| CN | 102712712 A | 10/2012 |
| CN | 103080139 A | 5/2013 |
| CN | 104072928 A | 10/2014 |
| CN | 108350189 A | 7/2018 |
| CN | 108884241 A | 11/2018 |
| CN | 109923157 A | 6/2019 |
| CN | 110167997 A | 8/2019 |
| CN | 110914347 A | 3/2020 |
| CN | 111433261 A | 7/2020 |
| CN | 112040919 A | 12/2020 |
| EP | 0744435 B1 | 9/2003 |
| EP | 1374919 A2 | 1/2004 |
| EP | 1592750 A1 | 11/2005 |
| EP | 1837348 A1 | 9/2007 |
| EP | 2399944 A1 | 12/2011 |
| EP | 2518092 A1 | 10/2012 |
| EP | 2589613 A1 | 5/2013 |
| EP | 2615117 A1 | 7/2013 |
| EP | 2650025 A1 | 10/2013 |
| EP | 3412710 A1 | 12/2018 |
| EP | 3540001 A1 | 9/2019 |
| EP | 3650491 A1 | 5/2020 |
| EP | 3708606 A1 | 9/2020 |
| EP | 3747938 A1 | 12/2020 |
| EP | 3757153 A1 | 12/2020 |
| EP | 3819330 A1 | 5/2021 |
| EP | 3872118 A1 | 9/2021 |
| JP | H06057010 A | 3/1994 |
| JP | H08253615 A | 10/1996 |
| JP | H10251310 A | 9/1998 |
| JP | 2002212331 A | 7/2002 |
| JP | 2002265528 A | 9/2002 |
| JP | 2004-261796 A | 9/2004 |
| JP | 2005097569 A | 4/2005 |
| JP | 3657287 B2 | 6/2005 |
| JP | 2006169385 A | 6/2006 |
| JP | 2006342306 A | 12/2006 |
| JP | 2008297512 A | 12/2008 |
| JP | 2011092930 A | 5/2011 |
| JP | 2011252080 A | 12/2011 |
| JP | 2012143755 A | 8/2012 |
| JP | 2012522880 A | 9/2012 |
| JP | 2013521962 A | 6/2013 |
| JP | 2014005472 A | 1/2014 |
| JP | 2015174971 A | 10/2015 |
| JP | 5871803 B2 | 3/2016 |
| JP | 5948532 B2 | 7/2016 |
| JP | 6013414 B2 | 10/2016 |
| JP | 2019-518839 A | 7/2019 |
| JP | 2019-519663 A | 7/2019 |
| JP | 2019518815 A | 7/2019 |
| JP | 2020520402 A | 7/2020 |
| JP | 2021505716 A | 2/2021 |
| JP | 2021516720 A | 7/2021 |
| JP | 2021518874 A | 8/2021 |
| JP | 2021521924 A | 8/2021 |
| KR | 20050016324 A | 2/2005 |
| KR | 20070004669 A | 1/2007 |
| KR | 100769976 B1 | 10/2007 |
| KR | 20110114535 A | 10/2011 |
| KR | 20140102264 A | 8/2014 |
| KR | 20140125420 A | 10/2014 |
| KR | 20140143292 A | 12/2014 |
| KR | 101511820 B1 | 4/2015 |
| KR | 20150087368 A | 7/2015 |
| KR | 20150132035 A | 11/2015 |
| KR | 20170020113 A | 2/2017 |
| KR | 20170033634 A | 3/2017 |
| KR | 20170075643 A | 7/2017 |
| KR | 20190026355 A | 3/2019 |
| KR | 20190069311 A | 6/2019 |
| KR | 20190072298 A | 6/2019 |
| KR | 20190075574 A | 7/2019 |
| KR | 20190114777 A | 10/2019 |
| KR | 20200055449 A | 5/2020 |
| KR | 2020-0075605 A | 6/2020 |
| KR | 20200071032 A | 6/2020 |
| KR | 20200075196 A | 6/2020 |
| KR | 20200085615 A | 7/2020 |
| KR | 20200128969 A | 11/2020 |
| KR | 102191077 B1 | 12/2020 |
| WO | 1996017884 A1 | 6/1996 |
| WO | 2004069936 A1 | 8/2004 |
| WO | 2010073658 A1 | 7/2010 |
| WO | 2010095427 A1 | 8/2010 |
| WO | 2011040472 A1 | 4/2011 |
| WO | 2011078298 A1 | 6/2011 |
| WO | 2012033025 A1 | 3/2012 |
| WO | 2014196789 A1 | 12/2014 |
| WO | 2015093594 A1 | 6/2015 |
| WO | 2019117541 A1 | 6/2019 |
| WO | 2019190120 A1 | 10/2019 |
| WO | 2019201668 A1 | 10/2019 |
| WO | 2020-101287 A1 | 5/2020 |
| WO | 2020122559 A1 | 6/2020 |
| WO | 2020-145548 A1 | 7/2020 |
| WO | 2020144948 A1 | 7/2020 |
| WO | 2020-226385 A1 | 11/2020 |
| WO | 2021132266 A1 | 7/2021 |

OTHER PUBLICATIONS

Jis J., "Testing method for water absorption rate of super absorbent polymers", Japanese Standards Association, Mar. 1996, 23 pages, JIS K 7224. [providing partial English translation only].
Third Party of Observation for PCT/KR2021/019242 dated Apr. 16, 2023. 7 pgs.
Third Party of Observation for PCT/KR2021/019247 dated Apr. 18, 2023. 19 pgs.
Third Party of Observation for PCT/KR2021/019249 dated Apr. 17, 2023. 16 pgs.
Third Party of Observation for PCT/KR2021/019246 dated Apr. 18, 2023. 11 pgs.
Third Party of Observation for PCT/KR2021/019244 dated Apr. 16, 2023. 5 pgs.
Schwalm, R. "UV Coatings Basics, Recent Developments and New Application," Elsevier Science, Dec. 21, 2006, p. 115.
Odian, G. "Principles of Polymerization" Dec. 1981, p. 203, Wiley Interscience Publication.
International Search Report for PCT/KR2021/019246 mailed Apr. 5, 2022. 3 pages.

(56) References Cited

OTHER PUBLICATIONS

International Search Report for PCT/KR2021/019242, mailed Apr. 1, 2022. 3 pages.
International Search Report for PCT/KR2021/019244, mailed Apr. 5, 2022. 2 pages.
International Search Report for PCT/KR2021/019249, mailed Mar. 31, 2022. 2 pages.
International Search Report for PCT/KR2021/019247, mailed Mar. 31, 2022. 2 pages.
Sohn, et al., "Method for Preparing Super Absorbent Polymer." U.S. Appl. No. 18/027,439, filed Mar. 21, 2023.
Ryu, et al., "Super Absorbent Polymer and Preparation Method Thereof." U.S. Appl. No. 18/028,282, filed Mar. 24, 2023.
Yoon, et al., "Method for Preparing Super Absorbent Polymer." U.S. Appl. No. 18/026,495, filed Mar. 15, 2023.
Shin, et al., "Method for Preparing Super Absorbent Polymer." U.S. Appl. No. 18/028,295, filed Mar. 24, 2023.

* cited by examiner

[FIG. 1]
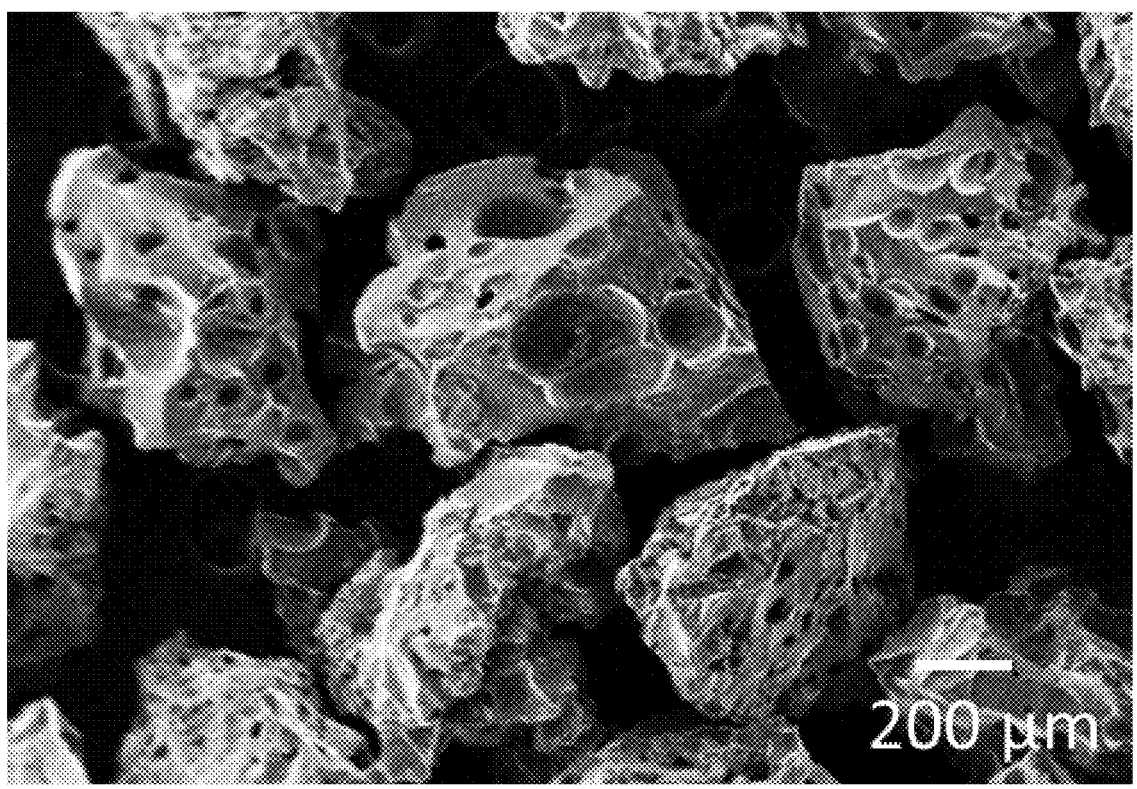

[FIG. 2]
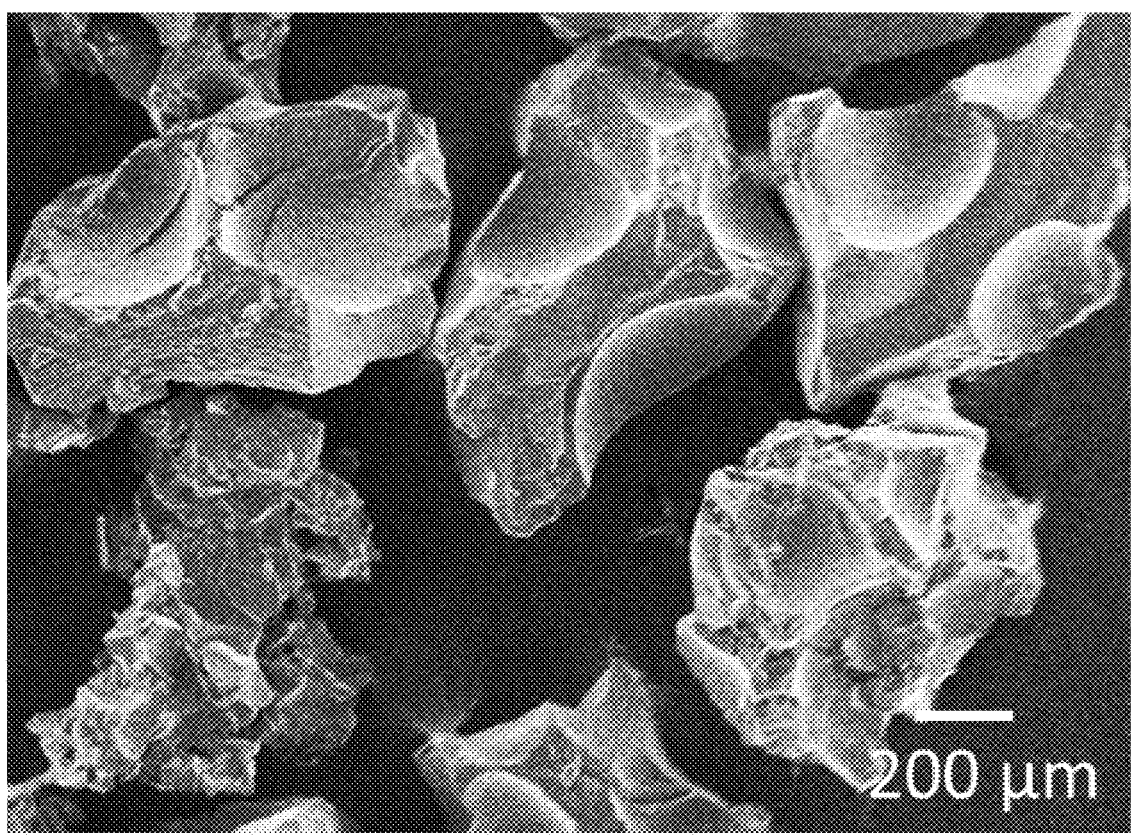

SUPER ABSORBENT POLYMER AND PREPARATION METHOD THEREOF

CROSS-REFERENCE TO RELATED APPLICATIONS

The present application is a national stage entry under 35 U.S.C. § 371 of International Application No. PCT/KR2021/019247 filed on Dec. 17, 2021, which claims priority from Korean Patent Applications No. 10-2020-0178428 filed on Dec. 18, 2020 and No. 10-2021-0180575 filed on Dec. 16, 2021, all the disclosures of which are incorporated herein by reference.

TECHNICAL FIELD

The present disclosure relates to a super absorbent polymer and a method for preparing the same. More specifically, it relates to a super absorbent polymer having a plurality of micropores and thus exhibiting an improved absorption rate and a high surface tension, and a method for preparing the super absorbent polymer.

BACKGROUND OF ART

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products, but also for water retaining soil products for gardening, water stop materials for the civil engineering and construction, sheets for raising seedling, fresh-keeping agents for food distribution fields, materials for poultices, or the like.

These super absorbent polymers have been widely used in the field of hygienic materials such as diapers or sanitary napkins. In such hygienic materials, the super absorbent polymer is generally contained in a state of being spread in the pulp. In recent years, however, continuous efforts have been made to provide hygienic materials such as diapers having a thinner thickness. As a part of such efforts, the development of so-called pulpless diapers and the like in which the pulp content is reduced or pulp is not used at all is being actively advanced.

The super absorbent polymer used for sanitary products such as pulpless diapers with a reduced pulp content or without pulp should not only function as an absorbent for absorbing liquids such as urine, but also play a role of pulp. Therefore, it is required to exhibit a fast absorption rate as well as excellent absorption performance.

In order to prepare a super absorbent polymer having such an improved absorption rate, a method of improving a specific surface area by introducing a pore structure into the super absorbent polymer is mainly used. Specifically, in order to improve the specific surface area of the super absorbent polymer, a foaming agent may be used to generate bubbles or a gas such as carbon dioxide gas, air, or nitrogen gas may be injected in the polymerization step. However, since bubbles are unstable in the neutralization solution, when a foam stabilizer capable of capturing these bubbles is not used, the bubbles come out of the neutralization solution, making it impossible to prepare a super absorbent polymer having a pore structure. In addition, when the foam stabilizer is used in excess, there has been a problem in that general physical properties of the super absorbent polymer are deteriorated.

Accordingly, there is a continuous demand for the development of a super absorbent polymer having a fast absorption rate while maintaining basic absorbency.

DETAILED DESCRIPTION OF THE INVENTION

Technical Problem

Accordingly, the present disclosure relates to a super absorbent polymer having a developed porous structure including a large number of micropores, and thus exhibiting an improved absorption rate and excellent physical properties such as high surface tension, and a method for preparing the same.

Technical Solution

In order to solve the above problems, there is provided a super absorbent polymer, including
- a powder-type base resin including a cross-linked polymer of an acrylic acid-based monomer having at least partially neutralized acidic groups and an internal cross-linking agent; and
- a surface cross-linked layer formed by further cross-linking the cross-linked polymer using a surface cross-linking agent on the base resin,
- wherein the super absorbent polymer has an average of 7 or more pores per particle, the plurality of pores have an average diameter of 100 μm or less and a maximum diameter of 300 μm or less, and the number of particles having pores having a diameter greater than or equal to the average diameter and less than or equal to the maximum diameter accounts for 10 to 50% of the total number of super absorbent polymer particles, and
- the super absorbent polymer has a surface tension of 65 mN/m or more and a vortex time at 24.0° C. of 40 seconds or less.

In addition, there is also provided a method for preparing a super absorbent polymer, including the steps of:
- preparing a monomer composition containing an acrylic acid-based monomer having at least partially neutralized acidic groups, a polymerization initiator, an internal cross-linking agent, and an aqueous dispersion of hydrophobic particles (step 1);
- preparing a hydrogel polymer by cross-linking polymerization of the monomer composition in the presence of a foaming agent or a bubble generator (step 2);
- forming a powder-type base resin by drying and pulverizing the hydrogel polymer (step 3); and
- forming a surface cross-linked layer by further cross-linking the surface of the base resin in the presence of a surface cross-linking agent (step 4),
- wherein the aqueous dispersion of hydrophobic particles is a colloidal solution in which first hydrophobic particles and second hydrophobic particles are dispersed, and a ratio of an average particle diameter of the second hydrophobic particles to an average particle diameter of the first hydrophobic particles is 5 to 100.

Advantageous Effects

The super absorbent polymer of the present disclosure includes a large number of micropores having an average diameter of 100 μm or less and a maximum diameter of 300 μm or less, and in particular, may have a highly developed porous structure in which a plurality of pores having a very uniform diameter are formed. As a result, as the specific surface area of the super absorbent polymer is greatly increased, an improved absorption rate may be exhibited.

Such a super absorbent polymer can be prepared by introducing two types of hydrophobic particles having different particle diameters in the form of an aqueous dispersion in the polymerization step. The use of these hydrophobic particles forms a super absorbent polymer having a highly developed porous structure, and minimizes or eliminates the use of a surfactant commonly used as a foam stabilizer, thereby minimizing deterioration in physical properties such as surface tension of the super absorbent polymer.

Therefore, according to the present disclosure, it is possible to provide a super absorbent polymer, which is preferably used for a pulpless diaper or an ultra-thin diaper, by exhibiting an excellent absorption rate and excellent other physical properties.

BRIEF DESCRIPTION OF THE DRAWINGS

FIG. 1 is a SEM image of the super absorbent polymer prepared in Example 3.

FIG. 2 is a SEM image of the super absorbent polymer prepared in Comparative Example 2.

DETAILED DESCRIPTION OF THE EMBODIMENTS

The terminology used herein is for the purpose of describing particular embodiments only and is not intended to limit the invention. The singular forms are intended to include the plural forms as well, unless the context clearly indicates otherwise. It will be further understood that the terms "include", "have", or "possess" when used in this specification, specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

In addition, the terminologies are used merely to refer to specific embodiments, and are not intended to restrict the present disclosure. Singular expressions of the present disclosure may include plural expressions unless they are differently expressed contextually.

The terminology "polymer" in the present disclosure is in a state in which a water-soluble ethylene-based unsaturated monomer is polymerized, and may include all moisture content ranges, or all particle diameter ranges. Among the polymers, a polymer having a moisture content of about 40 wt % or more after polymerization and before drying may be referred to as a hydrogel polymer, and particles in which the hydrogel polymer is pulverized and dried may be referred to as a cross-linked polymer.

In addition, the terminology "super absorbent polymer particle" refers to a particulate material containing a cross-linked polymer in which an acrylic acid-based monomer having at least partially neutralized acidic groups is polymerized and cross-linked by an internal cross-linking agent.

Also, the terminology "cross-linked polymer" refers to a polymer having a three-dimensional network structure in which main chains formed by polymerization of the acrylic acid-based monomer are cross-linked by an internal cross-linking agent.

In addition, the terminology "super absorbent polymer" is used to encompass all of a cross-linked polymer in which an acrylic acid-based monomer having at least partially neutralized acidic groups is polymerized or a base resin in the form of powder consisting of super absorbent polymer particles in which the cross-linked polymer is pulverized, and the cross-linked polymer or the base resin further processed, for example, surface cross-linking, fine reassembling, drying, pulverization, classification, etc., to be in a state suitable for commercialization, depending on the context. Accordingly, the terminology "super absorbent polymer" may be interpreted as including a plurality of super absorbent polymer particles.

In addition, the terminology "average diameter" of pores refers to an average value of the longest diameter values of each of the plurality of pores included in the super absorbent polymer.

In addition, the terminology "maximum diameter" of the pores refers to the maximum value among the longest diameter values of each of the plurality of pores included in the super absorbent polymer.

In order to prepare a super absorbent polymer having a fast absorption rate, the specific surface area in the super absorbent polymer particles needs to be increased. Accordingly, in order to prepare a super absorbent polymer having a high specific surface area, a method of forming a plurality of pores in the super absorbent polymer by inducing a foaming process during the manufacturing process or a method of mechanically modifying the super absorbent polymer has been used. In the preparation method of the super absorbent polymer with the foaming process, a surfactant-type foam stabilizer is used so that the bubbles generated during the process are captured inside the polymer without escaping out of the cross-linked polymer. However, when such a foam stabilizer is used, a pore size is large, a range of the pore size is wide, and an aspect ratio of the super absorbent polymer particles is low, so there is a problem in that the polymer is easily broken by the process environment or physical properties under pressure are deteriorated due to uneven surface cross-linking efficiency. In addition, in the preparation method of the super absorbent polymer with mechanical modification, an excessive load was applied to the equipment during the process, causing a decrease in productivity.

Accordingly, the present inventors have found that when two types of hydrophobic particles having different average particle diameters are used in the form of an aqueous dispersion instead of the commonly used foam stabilizer, it is possible to provide a super absorbent polymer having a developed pore structure in which a plurality of pores, specifically in an average of 7 or more pores per particle of the super absorbent polymer, having an average diameter of 100 μm or less and a maximum diameter of 300 μm or less are formed. In addition, in the super absorbent polymer, the number of particles having pores having a diameter greater than or equal to the average diameter and less than or equal to the maximum diameter, that is, particles having at least one pore having a relatively large diameter, accounts for 10 to 50% of the total number of super absorbent polymer particles. This may indicate that the number of particles having pores having a relatively large diameter is not large, so that a large number of micropores having a diameter close to or slightly smaller than the average diameter are very uniformly distributed on the super absorbent polymer particles. Accordingly, the super absorbent polymer may have a developed porous structure in which a large number of micropores having a relatively small diameter are very uniformly distributed.

It has been confirmed that the super absorbent polymer not only exhibits an ultra-high absorption rate, but also has a high surface tension, due to such a highly developed porous structure. Specifically, it has been confirmed that when two types of hydrophobic particles having different particle diameters are introduced in the polymerization step of the monomer in the form of an aqueous dispersion, the bubbles generated by the foaming agent or bubble generator are effectively captured and stabilized even if the input of a separate surfactant-type foam stabilizer is minimized or there is no substantial input of the foam stabilizer. Accordingly, it is possible to prepare a super absorbent polymer having a developed porous structure in which pores having a small size and uniform shape are evenly distributed over the entire area of the cross-linked polymer.

More specifically, in the method for preparing a super absorbent polymer of one embodiment, the two types of hydrophobic particles are not used in the form of a powder, but each is added to the monomer composition in the form of an "aqueous dispersion of hydrophobic particles". In other words, the hydrophobic particles are introduced into the monomer composition in the form of a colloidal solution in which each hydrophobic particle is stably dispersed without being precipitated or agglomerated. This is because, when the polymerization process is performed by introducing the hydrophobic particles into the monomer composition in the form of a powder, the hydrophobic particles are precipitated without being dispersed in the monomer composition in the form of an aqueous solution, so that the generated bubbles cannot be effectively stabilized.

In addition, each hydrophobic particle is stably dispersed in the aqueous dispersion by a dispersion stabilizer without agglomeration between particles. Specifically, the dispersion stabilizer may form an electric double layer on the surface of hydrophobic particles to induce an electrostatic repulsive force between particles, which may stabilize the hydrophobic particles, or the surfactant may be adsorbed on the surface of hydrophobic particles to induce a steric repulsive force between particles, which may prevent the particles from agglomerating with each other. Therefore, when a dispersion stabilizer is not included in the aqueous dispersion of hydrophobic particles, a phenomenon in which the hydrophobic particles agglomerate with each other or sink due to gravity is caused, so that dispersion of the hydrophobic particles cannot be stabilized. Accordingly, when an aqueous dispersion of hydrophobic particles that does not contain a dispersion stabilizer is used together with a foaming agent in the polymerization step, it is impossible to effectively capture bubbles and thus pores cannot be formed in the super absorbent polymer, so it is difficult to improve the absorption rate of the super absorbent polymer. However, the type of the dispersion stabilizer will be further described in the preparation method to be described later.

In addition, the first hydrophobic particles have an average particle diameter of less than 1 μm, and the second hydrophobic particles have an average particle diameter of 1 μm or more. This is to lower the interfacial energy of bubbles in the monomer composition when large particles and small particles are present together, so that small bubbles can be stabilized even with a small amount. Accordingly, the super absorbent polymer according to one embodiment exhibits a more improved absorption rate and a high surface tension, and thus can be very preferably applied to various sanitary products.

Hereinafter, the super absorbent polymer and the method for preparing a super absorbent polymer according to specific embodiments of the present disclosure will be described in more detail.

Super Absorbent Polymer

The super absorbent polymer according to one embodiment includes a powder-type base resin including a cross-linked polymer of an acrylic acid-based monomer having at least partially neutralized acidic groups and an internal cross-linking agent; and a surface cross-linked layer formed by further cross-linking the cross-linked polymer using a surface cross-linking agent on the base resin.

In particular, the super absorbent polymer is a porous super absorbent polymer including a plurality of pores, and each of the plurality of pores has an average diameter of 100 μm or less and a maximum diameter of 300 μm or less. At this time, when the average diameter of the plurality of pores included in the super absorbent polymer exceeds 100 μm or the maximum diameter exceeds 300 μm, the specific surface area of the super absorbent polymer is not sufficient, so it is difficult to expect an improvement in absorption rate. In addition, the surface of the super absorbent polymer may be easily worn or broken during the process, so that physical properties may be deteriorated and more fines may be generated. Therefore, the super absorbent polymer according to the embodiment has a pore structure in which micropores are uniformly distributed, thereby exhibiting high absorption capacity while having a significantly improved absorption rate, compared to a porous super absorbent polymer including a plurality of pores having an average diameter of 100 μm or less but a maximum diameter exceeding 300 μm.

For example, the plurality of pores included in the super absorbent polymer may have an average diameter of 1 μm to 100 μm and a maximum diameter of 250 μm to 300 μm.

In addition, in the super absorbent polymer, the pores satisfying the above-described average and maximum diameters may be included in an average of 7 or more, or 7 to 30 pores per particle of the super absorbent polymer.

In addition, one or more pores having a diameter equal to or greater than the average diameter and less than or equal to the maximum diameter, that is, one or more pores having a relatively large diameter among the plurality of pores may be formed only on particles corresponding to 10 to 50%, or 20 to 40% of the total number of super absorbent polymer particles. This may mean that a large number of micropores having a diameter close to or slightly smaller than the average diameter are formed in a very uniform and narrow diameter distribution on a majority of the super absorbent polymer particles. Accordingly, the super absorbent polymer may have a developed pore structure in which a large number of micropores having very uniform diameters are formed in most particles.

Due to such a highly developed porous structure, the above-described super absorbent polymer can exhibit a greatly improved absorption rate. In contrast, the super absorbent polymer foamed and prepared using a conventional foaming agent or a bubble generator without the use of an aqueous dispersion of hydrophobic particles has difficulty in stabilizing bubbles. Thus, it may not have a sufficiently developed porous structure, or other physical properties such as surface tension of the super absorbent polymer may be reduced, because the use of a significant amount of a foam stabilizer is inevitable.

Meanwhile, the average diameter and maximum diameter of pores in the above-described super absorbent polymer, the average number of pores per particle, and the proportion of particles having relatively large pores can be confirmed by observing the surface and/or internal images of the super absorbent polymer particles to be measured with an electron microscope. More specifically, the average diameter may be obtained by measuring the longest diameter of each of the pores included in the super absorbent polymer particles, and then calculating an average value of the longest diameters of the pores. And, the maximum diameter may be obtained by taking the maximum value. In addition, the average number of pores per particle can be obtained by calculating the number of pores capable of measuring the longest diameter on an electron microscope. The proportion of particles having pores having a diameter greater than or equal to the average diameter and less than or equal to the maximum diameter can be calculated by measuring the number of pores whose longest diameter is greater than or equal to the average diameter, and the number of particles having the corresponding pores. At this time, it is preferable to select 300 or more pores for one super absorbent polymer sample (e.g., a super absorbent polymer sample prepared through a single process), measure their diameters, and then obtain the average diameter and the maximum diameter.

In addition, the acrylic acid-based monomer is a compound represented by the following Chemical Formula 1:

$$R^1\text{-COOM}^1 \quad \quad \text{Chemical Formula 1}$$

in Chemical Formula 1, $R^1$ is a C2 to C5 alkyl group having an unsaturated bond, and $M^1$ is a hydrogen atom, a monovalent or divalent metal, an ammonium group, or an organic amine salt.

Preferably, the acrylic acid-based monomer may include at least one selected from the group consisting of acrylic acid, methacrylic acid, and a monovalent metal salt, a divalent metal salt, an ammonium salt and an organic amine salt thereof.

Herein, the acrylic acid-based monomers may be those having acidic groups which are at least partially neutralized. Preferably, the acrylic acid-based monomer partially neutralized with an alkali substance such as sodium hydroxide, potassium hydroxide, ammonium hydroxide, or the like may be used. A degree of neutralization of the acrylic acid-based monomer may be 40 to 95 mol %, 40 to 80 mol %, or 45 to 75 mol %. The range of the degree of neutralization can be adjusted according to final properties. An excessively high degree of neutralization causes the neutralized monomers to be precipitated, and thus polymerization may not readily occur. On the contrary, an excessively low degree of neutralization not only deteriorates absorbency of the polymer, but also gives the polymer hard-to-handle properties, such as those of an elastic rubber.

In addition, a concentration of the acrylic acid-based monomer may be about 20 to 60 wt %, or about 40 to 50 wt % based on the monomer composition containing the raw materials of the super absorbent polymer and the solvent, and properly controlled in consideration of polymerization time and reaction conditions. When the concentration of the monomer is excessively low, the yield of the super absorbent polymer is low and there may be a problem in economic efficiency. In contrast, when the concentration is excessively high, it may cause problems in processes in that some of the monomer may be extracted or the pulverization efficiency of the polymerized hydrogel polymer may be lowered in the pulverization process, and thus physical properties of the super absorbent polymer may be deteriorated.

In addition, the terminology 'internal cross-linking agent' used herein is different from a surface cross-linking agent for cross-linking the surface of the super absorbent polymer particles to be described later, and the internal cross-linking agent polymerizes unsaturated bonds of the water-soluble ethylene-based unsaturated monomers by cross-linking. The cross-linking in the above step proceeds both on the surface and on the inside, but when the surface cross-linking process of the super absorbent polymer particles to be described later is in progress, the surface of the particles of the finally prepared super absorbent polymer has a structure cross-linked by a surface cross-linking agent, and the inside of the particles has a structure cross-linked by the internal cross-linking agent.

As the internal cross-linking agent, any compound may be used as long as it allows the introduction of cross-linking bonds during polymerization of the acrylic acid-based monomer. Specifically, the internal cross-linking agent may be a cross-linking agent having one or more ethylene-based unsaturated groups in addition to the functional group which may react with the water-soluble substituents of the acrylic acid-based monomer; or a cross-linking agent having two or more functional groups which may react with the water-soluble substituents of the monomer and/or the water-soluble substituents formed by hydrolysis of the monomer.

For example, as the internal cross-linking agent, a multifunctional cross-linking agent may be used alone or in combination of two or more. Specifically, examples of the internal cross-linking agent include an acrylate-based compound such as N,N'-methylenebisacrylamide, trimethylpropane tri(meth)acrylate, ethylene glycol di(meth)acrylate, polyethylene glycol (meth)acrylate, polyethylene glycol di(meth)acrylate, propylene glycol di(meth)acrylate, polypropylene glycol (meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentaacrylate, glycerin tri(meth)acrylate, and pentaerythritol tetraacrylate; an epoxy-based compound such as ethylene glycol diglycidyl ether, diethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, polytetramethylene glycol diglycidyl ether, glycerol diglycidyl ether, glycerol triglycidyl ether, diglycerol polyglycidyl ether and polyglycerol polyglycidyl ether; triarylamine; propylene glycol; glycerin; and ethylene carbonate, but the present disclosure is not limited thereto.

The cross-linking polymerization of the water-soluble ethylene-based unsaturated monomer in the presence of the internal cross-linking agent may be performed by thermal polymerization, photopolymerization or hybrid polymerization in the presence of a polymerization initiator with or without a thickener, a plasticizer, a preservation stabilizer, an antioxidant, etc., but the specific details will be described later.

In addition, the super absorbent polymer further includes a surface cross-linked layer formed by further cross-linking the cross-linked polymer included in the base resin using a surface cross-linking agent on at least a part of the surface of the base resin. This is to increase the surface cross-linking density of the super absorbent polymer. When the super absorbent polymer further includes a surface cross-linked layer as described above, it has a structure having a higher cross-linking density on the outside than on the inside.

As the surface cross-linking agent, any surface cross-linking agent that has been conventionally used in the preparation of super absorbent polymers may be used without particular limitation. For example, the surface cross-linking agent may include at least one selected from the group consisting of a polyalcohol-based compound, a polyepoxy-based compound, a polyamine compound, a haloepoxy compound, a condensation product of a haloepoxy compound, an oxazoline-based compound, and an alkylene carbonate-based compound.

Specifically, as the polyalcohol-based compound, mono-, di-, tri-, tetra- or polyethylene glycol, monopropylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, 1,2-cyclohexane dimethanol, or the like may be used.

In addition, as the polyepoxy-based compound, ethylene glycol diglycidyl ether, glycidol, or the like may be used.

As the polyamine compound, ethylene diamine, diethylene triamine, triethylene tetraamine, tetraethylene pentamine, pentaethylene hexamine, polyethylene imine, polyamide polyamine, or the like may be used.

Further, as the haloepoxy compound, epichlorohydrin, epibromohydrin, α-methylepichlorohydrin, or the like may be used.

In addition, as the oxazoline-based compound, mono-, di-, or polyoxazolidinone may be used.

In addition, as the alkylene carbonate compound, ethylene carbonate, propylene carbonate, glycerol carbonate, or the like may be used.

More specifically, the surface cross-linking agents described above may be used alone or in combination with each other. For example, an alkylene carbonate compound such as ethylene carbonate may be used as the surface cross-linking agent.

In addition, the super absorbent polymer may include first hydrophobic particles and second hydrophobic particles, wherein the first hydrophobic particles have an average particle diameter of less than 1 μm, and the second hydrophobic particles have an average particle diameter of 1 μm or more.

Herein, the hydrophobic particles refer to water-insoluble particles having a water contact angle of 50° or more or not soluble in water. Particles having a water contact angle of less than 50° and water-soluble particles may be dissolved in the monomer composition in the form of an aqueous solution, and thus it is difficult to capture bubbles generated in the polymerization process. On the other hand, the hydrophobic particles are located at the interface between the bubbles hydrophobic in the neutralizing solution such as carbon dioxide and the neutralizing solution, so that the bubbles can be effectively captured and then stabilized.

Accordingly, each of the first hydrophobic particles and the second hydrophobic particles has a water contact angle of 50° or more. More specifically, each of the first hydrophobic particles and the second hydrophobic particles may have a water contact angle of 70° or more, 100° or more, 120° or more, or 150° or more, and 175° or less.

In this case, the contact angle of the first and second hydrophobic particles may be measured in the following manner. First, a coating solution in which each hydrophobic particle is dispersed in a methylene chloride solvent at a concentration of 5 wt % is prepared. Next, the coating solution was spin-coated on a wafer without surface roughness, and dried at room temperature to remove the remaining solvent. Then, a contact angle is measured by dropping water dropwise on the coated layer, and defined as the contact angle of each hydrophobic particle.

In addition, the first hydrophobic particles have an average particle diameter of less than 1 μm, specifically 10 nm or more and less than 1 μm. More specifically, the average particle diameter of the first hydrophobic particles may be 10 nm or more, 50 nm or more, or 100 nm or more, and 800 nm or less, 600 nm or less, 400 nm or less, or 300 nm or less.

In addition, the second hydrophobic particles have an average particle diameter of 1 μm or more, specifically, 1 μm to 100 μm. More specifically, the average particle diameter of the second hydrophobic particles may be 2 μm or more, or 3 μm or more, and 50 μm or less, 30 μm or less, 20 μm or less, 10 μm or less, or 7 μm or less.

Herein, the average particle diameter of the hydrophobic particles means D50, and the "particle diameter Dn" means a particle diameter at the n % point of the cumulative distribution of the number of particles according to particle diameters. In other words, D50 is a particle diameter at the 50% point of the cumulative distribution of the number of particles according to particle diameters, D90 is a particle diameter at the 90% point of the cumulative distribution of the number of particles according to particle diameters, and D10 is a particle diameter at the 10% point of the cumulative distribution of the number of particles according to particle diameters. The Dn may be measured using a laser diffraction method. Specifically, the powder to be measured is dispersed in the dispersion medium and introduced into a commercially available particle size measuring device (e.g., Microtrac S3500). Then, a particle size distribution is obtained by measuring a difference in diffraction patterns according to particle diameters when the particles pass through the laser beam. In the measuring device, D10, D50 and D90 can be obtained by calculating a particle diameter at a point of reaching 10%, 50% and 90% of the cumulative distribution of the number of particles according to particle diameters.

In addition, a ratio of the average particle diameter of the second hydrophobic particles to the average particle diameter of the first hydrophobic particles may be 5 to 100, more specifically, 10 to 50. When the second hydrophobic particles have an excessively small average particle diameter compared to the first hydrophobic particles, or when the second hydrophobic particles have an excessively large average particle diameter compared to the first hydrophobic particles, it is difficult to capture small-sized bubbles, so that the bubble size may increase.

In addition, the first hydrophobic particles and the second hydrophobic particles may be included in a weight ratio of 1:5 to 1:50. When the second hydrophobic particles are included in an excessively small amount compared to the first hydrophobic particles, it may be difficult to capture and maintain the gas in the monomer composition. When the second hydrophobic particles are included in an excessively large amount compared to the first hydrophobic particles, the size of the pores may increase. For example, the second hydrophobic particles may be used in an amount of 6 times or more, 8 times or more, or 10 times or more, and 40 times or less, 30 times or less, or 20 times or less the weight of the first hydrophobic particles.

In addition, the first hydrophobic particles and the second hydrophobic particles may each independently be selected from the group consisting of hydrophobic silica, a metal salt of a C7 to C24 fatty acid, and hydrophobic organic particles.

Specifically, both the first hydrophobic particles and the second hydrophobic particles are hydrophobic silica; one of the first hydrophobic particles and the second hydrophobic particles is hydrophobic silica, and the other is a metal salt of a C7 to C24 fatty acid; or both the first hydrophobic particles and the second hydrophobic particles are a metal salt of a C7 to C24 fatty acid.

Herein, the hydrophobic silica is a generic term for silica having a water contact angle of 50° or more due to a small content of silanol (—SiOH) on its surface, and hydrophobic silica known in the art may be used without limitation.

In addition, the metal salt of a C7 to C24 fatty acid refers to a compound in which a metal cation is bonded instead of a hydrogen ion of a carboxyl group at the end of an unsaturated or saturated fatty acid having a linear structure while having 7 to 24 carbon atoms in the molecule, and may be a monovalent metal salt, or a polyvalent metal salt of divalent or higher. At this time, when the hydrophobic particles are a metal salt of a fatty acid having less than 7 carbon atoms, it is not possible to capture the bubbles generated in the form of particles by ionization in an aqueous solution. When the hydrophobic particles are a metal salt of a fatty acid having more than 24 carbon atoms, the chain of the fatty acid becomes long, which may cause difficult dispersion.

Specifically, when the metal salt of the fatty acid is a monovalent metal salt, it has a structure in which one fatty acid carboxylate anion is bonded to an alkali ion, which is a monovalent metal cation. In addition, when the metal salt of the fatty acid is a polyvalent metal salt of divalent or higher, it has a structure in which as many as fatty acid carboxylate anions as the number of the valence of the metal cation are bonded to the metal cation.

In one embodiment, the hydrophobic particles may be a metal salt of a C12 to C20 saturated fatty acid. For example, the hydrophobic particles may be at least one metal salt of a saturated fatty acid selected from the group consisting of a metal salt of lauric acid containing 12 carbon atoms in the molecule; a metal salt of tridecyl acid containing 13 carbon atoms in the molecule; a metal salt of myristic acid containing 14 carbon atoms in the molecule; a metal salt of pentadecanoic acid containing 15 carbon atoms in the molecule; a metal salt of palmitic acid containing 16 carbon atoms in the molecule; a metal salt of margaric acid containing 17 carbon atoms in the molecule; a metal salt of stearic acid containing 18 carbon atoms in the molecule; a metal salt of nonadecylic acid containing 19 carbon atoms in the molecule; and a metal salt of arachidic acid containing 20 carbon atoms in the molecule.

Preferably, the metal salt of a fatty acid may be a metal salt of stearic acid. For example, it may be at least one metal salt of stearic acid selected from the group consisting of calcium stearate, magnesium stearate, sodium stearate, zinc stearate and potassium stearate.

In addition, the hydrophobic organic particles may be at least one selected from the group consisting of an ethylene polymer, a propylene polymer, a styrene polymer, a butadiene polymer, a styrene-butadiene copolymer, an alkyl acrylate polymer, an alkyl methacrylate polymer, an alkyl acrylate-acrylonitrile copolymer, an acrylonitrile-butadiene copolymer, an acrylonitrile-butadiene-styrene copolymer, an acrylonitrile-alkyl acrylate-styrene copolymer, an alkyl methacrylate-butadiene-styrene copolymer, and an alkyl acrylate-alkyl methacrylate copolymer.

Meanwhile, the super absorbent polymer may include particles having a particle diameter of about 150 to about 850 μm in an amount of 90 wt % or more, or 90 to 100 wt % based on the total weight, and the particle diameter may be measured in accordance with the EDANA (European Disposables and Nonwovens Association) WSP 220.3. The above-described average diameter of pores, the longest diameter, the average number of pores per particle, and the proportion of particles having pores of a predetermined diameter, etc., may be measured and calculated for the super absorbent polymer particles having a particle diameter of 150 to about 850 μm.

In addition, the super absorbent polymer may have a vortex time (absorption rate) of 40 seconds or less, 39 seconds or less, or 38 seconds or less at 24° C. In addition, as the lower vortex time can be evaluated as the better, the lower limit is theoretically 0 seconds, but may be 5 seconds or more, 10 seconds or more, or 20 seconds or more. The method for measuring the vortex time of the super absorbent polymer will be described in more detail in the following experimental examples.

In addition, the super absorbent polymer may have a surface tension of 65 mN/m or more, 66 mN/m or more, or 68 mN/m or more, and 72 mN/m or less, or 71 mN/m or less. The method for measuring the surface tension of the super absorbent polymer will be described in more detail in the following experimental examples.

In addition, the super absorbent polymer may have centrifuge retention capacity (CRC) measured according to the EDANA WSP 241.3 of more than 27 g/g, and absorbency under pressure (AUP) at 0.7 psi measured according to the EDANA WSP 242.3 of more than 20 g/g. More specifically, the super absorbent polymer may have centrifuge retention capacity (CRC) measured according to the EDANA WSP 241.3 of 27.5 g/g or more, or 28 g/g or more, and 34 g/g or less, or 33 g/g or less. In addition, the super absorbent polymer may have absorbency under pressure (AUP) at 0.7 psi measured according to the EDANA WSP 242.3 of 21 g/g or more, 22 g/g or more, or 23 g/g or more, and 28 g/g or less, or 27 g/g or less.

Method for Preparing Super Absorbent Polymer

Meanwhile, the super absorbent polymer may be prepared by a method including the steps of: preparing a monomer composition containing an acrylic acid-based monomer having at least partially neutralized acidic groups, a polymerization initiator, an internal cross-linking agent, and an aqueous dispersion of hydrophobic particles (step 1); preparing a hydrogel polymer by cross-linking polymerization of the monomer composition in the presence of a foaming agent or a bubble generator (step 2); forming a powder-type base resin by drying and pulverizing the hydrogel polymer (step 3); and forming a surface cross-linked layer by further cross-linking the surface of the base resin in the presence of a surface cross-linking agent (step 4).

Herein, the aqueous dispersion of hydrophobic particles is a colloidal solution in which first hydrophobic particles and second hydrophobic particles are dispersed, and a ratio of the average particle diameter of the second hydrophobic particles to the average particle diameter of the first hydrophobic particles is 5 to 100.

At this time, the aqueous dispersion of hydrophobic particles may be in the form of an aqueous dispersion including the first hydrophobic particles and the second hydrophobic particles together, or may be in the form of a mixture of a first aqueous dispersion of hydrophobic particles in which the first hydrophobic particles are dispersed and a second aqueous dispersion of hydrophobic particles in which the second hydrophobic particles are dispersed.

In addition, the first hydrophobic particles have an average particle diameter of less than 1 μm, and the second hydrophobic particles have an average particle diameter of 1 μm or more. For details on other description of the first hydrophobic particles and the second hydrophobic particles, refer to the above.

Hereinafter, each step of the method for preparing a super absorbent polymer according to one embodiment will be described in more detail.

Step 1

The above step is to prepare a monomer composition containing an acrylic acid-based monomer having at least partially neutralized acidic groups, a polymerization initiator, an internal cross-linking agent, and an aqueous dispersion of hydrophobic particles. For details on the acrylic acid-based monomer and the internal cross-linking agent, refer to the above.

The first hydrophobic particles and the second hydrophobic particles may be included in the aqueous dispersion in an amount of 0.01 to 60 wt % based on a total weight of the aqueous dispersion. When the content of the hydrophobic particles in the hydrophobic aqueous dispersion is excessively low, the attraction force between the particles is lowered, so that dispersion stability is improved, but there is a problem in that a large amount must be added in the preparation of the super absorbent polymer. When the content of the hydrophobic particles in the hydrophobic aqueous dispersion is excessively high, dispersion stability may be deteriorated due to agglomeration between particles. However, the content of the hydrophobic particles in the aqueous dispersion is suitable as high as possible within a range in which dispersion stability can be ensured. This is because the higher the content of the hydrophobic particles in the aqueous dispersion, the better the bubble capturing ability, so that the super absorbent polymer may exhibit a more developed porous structure and an improved absorption rate.

Meanwhile, the first hydrophobic particles and the second hydrophobic particles may be uniformly dispersed in the aqueous dispersion by a dispersion stabilizer surrounding the particle surface such as a surfactant or a polymer, respectively. The surfactant may form an electric double layer on the surface of hydrophobic particles to induce an electrostatic repulsive force between particles, which may stabilize the hydrophobic particles to improve dispersion stability of the hydrophobic particles. In addition, the polymer may be adsorbed on the surface of hydrophobic particles to induce a steric repulsive force between particles, which may prevent the particles from agglomerating with each other to improve dispersion stability of the hydrophobic particles.

For example, one or more surfactants selected from the group consisting of cationic surfactants, anionic surfactants, amphoteric surfactants and nonionic surfactants may be used as the surfactant. Preferably, two or more surfactants may be used for dispersion stabilization of the hydrophobic particles. More specifically, in consideration of the form of the hydrophobic particles, for example, the form of a metal salt of a saturated fatty acid, a nonionic surfactant and an anionic surfactant may be used together in order to more effectively disperse the hydrophobic particles in water. For example, a nonionic surfactant to which a long-chain hydrocarbon having 10 or more carbon atoms is bonded and a sulfate-based anionic surfactant may be used together.

For example, examples of the cationic surfactant include dialkyldimethylammonium salt and alkylbenzylmethylammonium salt, examples of the anionic surfactant include alkylpolyoxyethylene sulfate, monoalkyl sulfate, alkylbenzene sulfonate, monoalkyl phosphate, a sulfate having a functional group containing a long-chain hydrocarbon or a sodium salt thereof such as sodium lauryl sulfate, sodium dodecyl sulfate or sodium laureth sulfate, examples of the amphoteric surfactant include alkylsulfobetaine and alkylcarboxybetaine, and examples of the nonionic surfactant include polyoxyethylene alkyl ether such as polyethylene glycol, polyoxyalkylene alkylphenyl ether, polyoxyethylene arylphenyl ether, fatty acid ester such as fatty acid sorbitan ester, glycerin monostearate, alkyl monoglyceryl ether, alkanolamide, and alkyl polyglycoside. However, the present disclosure is not limited thereto.

In addition, as the polymer used as the dispersion stabilizer, polyalkylene glycol, polyethyleneimide, polyvinyl alcohol, polyacrylamide, or polyvinylpyrrolidone may be used.

Meanwhile, each of the first hydrophobic particles and the second hydrophobic particles may be used in an amount of 0.005 to 1 parts by weight based on 100 parts by weight of the acrylic acid-based monomer. Specifically, the first hydrophobic particles may be used in an amount of 0.005 parts by weight or more, or 0.007 parts by weight or more, and 0.25 parts by weight or less, 0.1 parts by weight or less, or 0.05 parts by weight or less based on 100 parts by weight of the acrylic acid-based monomer. The second hydrophobic particles may be used in an amount of 0.025 parts by weight or more, or 0.035 parts by weight or more, and 0.75 parts by weight or less, 0.5 parts by weight or less, or 0.25 parts by weight or less based on 100 parts by weight of the acrylic acid-based monomer. In this case, the first hydrophobic particles and the second hydrophobic particles may be used in a weight ratio of 1:5 to 1:50 as described above.

In addition, a total weight of the first hydrophobic particles and the second hydrophobic particles may be 0.01 to 2 parts by weight based on 100 parts by weight of the acrylic acid-based monomer. When the total weight of the hydrophobic particles is too low, they may not function as a foam stabilizer. When the total weight of the aqueous dispersion of hydrophobic particles is too high, the surface tension of the super absorbent polymer may be lowered and flowability of the hydrophobic particles may be increased.

In the monomer composition, the internal cross-linking agent may be used in an amount of 0.01 to 5 parts by weight based on 100 parts by weight of the water-soluble ethylene-based unsaturated monomer. For example, the internal cross-linking agent may be used in an amount of 0.01 parts by weight or more, 0.05 parts by weight or more, 0.1 parts by weight or more, or 0.2 parts by weight or more, and 5 parts by weight or less, 3 parts by weight or less, 2 parts by weight or less, 1 parts by weight or less, or 0.7 parts by weight or less based on 100 parts by weight of the water-soluble ethylene-based unsaturated monomer. When too little internal cross-linking agent is used, cross-linking does not occur sufficiently, and thus it may be difficult to achieve strength above an appropriate level, and when too much internal cross-linking agent is used, the internal cross-linking density increases, and thus it may be difficult to achieve a desired level of water retention capacity.

In addition, the monomer composition may further include a polymerization initiator for initiating a polymerization reaction of the monomer. The polymerization initiator is not particularly limited as long as it is generally used in the preparation of super absorbent polymers.

Specifically, the polymerization initiator may be an initiator for thermal polymerization or an initiator for photopolymerization by UV radiation according to the polymerization method. However, even when the photopolymerization method is applied thereto, a certain amount heat is generated by UV radiation and the like, and some heat occurs as the polymerization reaction, an exothermal reaction, progresses. Therefore, the composition may additionally include the thermal polymerization initiator.

More specifically, any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, as the specific example of acyl phosphine, commercial lucirin TPO, namely, phenylbis(2,4,6-trimethylbenzoyl)phosphine oxide, may be used. More various photopolymerization initiators are well disclosed in "UV Coatings: Basics, Recent Developments and New Application (Elsevier, 2007)" written by Reinhold Schwalm, p 115, and the present disclosure is not limited thereto.

The photopolymerization initiator may be used at a concentration of about 0.01 to about 1.0 wt % based on the monomer composition. When the concentration of the photopolymerization initiator is excessively low, the polymerization rate may become slow, and when the concentration is excessively high, the molecular weight of the super absorbent polymer may become low and properties may be uneven.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate ($K_2S_2O_8$), ammonium persulfate (($NH4)_2S_2O_8$), and the like may be used as examples of the persulfate-based initiators; and 2,2-azobis-(2-amidinopropane)dihydrochloride, dimethylene)isobutyramidinedihydrochloride, 2-(carbamoylazo)isobutylonitril, 2,2-azobis-[2-(2-imidazolin-2-yl)propane]dihydrochloride, 4,4-azobis-(4-cyanovaleric acid), and the like may be used as examples of azo-based initiators. More various thermal polymerization initiators are well disclosed in "Principle of Polymerization (Wiley, 1981)" written by Odian, p 203, and the present disclosure is not limited thereto.

The thermal polymerization initiator may be used at a concentration of about 0.001 to about 0.5 wt % based on the monomer composition. When the concentration of the thermal polymerization initiator is excessively low, additional thermal polymerization hardly occurs and there may be less effect of adding the thermal polymerization initiator. When the concentration of the thermal polymerization initiator is excessively high, the molecular weight of the super absorbent polymer may become low and the properties may be uneven.

The polymerization initiator may be used in an amount of 2 parts by weight or less based on 100 parts by weight of the water-soluble ethylene-based unsaturated monomer. When the concentration of the polymerization initiator is excessively low, the polymerization rate may become slow, and a large amount of residual monomers may be extracted from the final product. Conversely, when the concentration of the polymerization initiator is higher than the above range, polymer chains forming a network are shortened, so that the content of extractable components increases and absorbency under pressure decreases, thereby lowering physical properties of the polymer.

The monomer composition may further include an additive such as a thickener, a plasticizer, a preservation stabilizer, and an antioxidant, if necessary.

In addition, the monomer composition containing the monomer may be, for example, in the form of a solution dissolved in a solvent such as water. The solid content of the monomer composition in a solution state, that is, the concentration of the monomer, the internal cross-linking agent, and the polymerization initiator may be appropriately adjusted in consideration of the polymerization time and reaction conditions. For example, the solid content of the monomer composition may be 10 to 80 wt %, 15 to 60 wt %, or 30 to 50 wt %.

When the monomer composition has the solid content in the above range, it may be advantageous for controlling the pulverization efficiency during pulverization of the polymer to be described later while eliminating the need to remove unreacted monomers after polymerization by using a gel effect phenomenon occurring in the polymerization reaction of a high-concentration aqueous solution.

At this time, any solvent which can dissolve the above components may be used without limitation. For example, the solvent may be in combination of at least one selected from water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, and N,N-dimethylacetamide.

Step 2

Subsequently, a step of preparing a hydrogel polymer by cross-linking polymerization of the monomer composition in the presence of a foaming agent or a bubble generator is performed. In the above step, bubbles are generated from the foaming agent or the bubble generator, and the two types of hydrophobic particles dispersed in water effectively capture these bubbles, thereby increasing the specific surface area of the prepared hydrogel polymer.

Meanwhile, the foaming agent may be a carbonate-based foaming agent. The carbonate-based foaming agent serves to increase the surface area by foaming during polymerization to form pores in the hydrogel polymer. For example, it may be at least one selected from the group consisting of sodium bicarbonate (sodium hydrogen carbonate), sodium carbonate, potassium bicarbonate, potassium carbonate, calcium bicarbonate, calcium carbonate, magnesium bicarbonate and magnesium carbonate.

The carbonate-based foaming agent may be used in an amount of 50 ppmw or more and 1 part by weight or less based on 100 parts by weight of the acrylic acid-based monomer. When the content of the foaming agent is less than 50 ppmw, the effect of using the foaming agent may be insignificant. When the content of the foaming agent exceeds 1 part by weight, there are too many pores in the cross-linked polymer, so that the gel strength of the super absorbent polymer to be prepared decreases and the density decreases, which may cause problems in distribution and storage. For example, the carbonate-based foaming agent may be used in an amount of 100 ppmw or more, and 0.8 parts by weight or less, or 0.7 parts by weight or less based on 100 parts by weight of the acrylic acid-based monomer.

In addition, the carbonate-based foaming agent and (the first hydrophobic particles and the second hydrophobic particles) may be used in a weight ratio of 1:0.01 to 1:10. When the aqueous dispersion of hydrophobic particles is used in an excessively low content compared to the carbonate-based foaming agent, it is difficult to effectively capture the generated bubbles, thereby increasing the pore size. When it is used in an excessively high content compared to the foaming agent, problems may occur in that the fluidity of the final product is increased, the bulk density is lowered, and the surface tension is lowered. For example, the sum of the weights of the first hydrophobic particles and the second hydrophobic particles may be 0.05 times or more, 0.1 times or more, or 0.5 times or more, and 5 times or less, 3 times or less, or 2 times or less of the weight of the carbonate-based foaming agent.

Meanwhile, a bubble generator may be used in place of the foaming agent, and any microbubble generator, or the like previously used for foaming the super absorbent polymer may be used without any particular limitation. An example of such a microbubble generator passes the monomer composition through a tubular flow path having a plurality of protruding pins mounted therein at a predetermined feeding rate, for example, at 50 to 1500 (L/min), and causes the monomer composition to collide with the protruding pins to foam. The example of such a microbubble generator is disclosed in Korean Patent Publication No. 2020-0128969, and it is also possible to obtain and apply commercial products applied in the following examples.

In addition, surfactants such as alkyl sulfate-based compounds and polyoxyethylene alkyl ether-based compounds commonly used as a foam stabilizer may not be used in the steps 1 and 2. For example, in the steps 1 and 2, anionic surfactants such as alkyl sulfate-based compounds, e.g., sodium dodecyl sulfate, ammonium lauryl sulfate, sodium lauryl ether sulfate, or sodium myreth sulfate; or nonionic surfactants such as alkyl ether sulfate-based compounds, e.g., polyoxyethylene lauryl ether may not be used. Accordingly, the problem of lowering the surface tension of the super absorbent polymer caused by the use of the surfactant can be prevented.

Meanwhile, the polymerization of the monomer composition in the presence of such an aqueous dispersion of hydrophobic particles is not particularly limited as long as it is a commonly used polymerization method.

Specifically, the polymerization method is largely divided into the thermal polymerization and the photopolymerization according to an energy source of the polymerization. In the case of thermal polymerization, it is generally carried out in a reactor equipped with an agitation spindle, such as a kneader. In the case of photopolymerization, it may be carried out in a reactor equipped with a movable conveyor belt. However, the polymerization method is just an example, and the present disclosure is not limited thereto.

For example, in the reactor equipped with an agitation spindle such as a kneader, the hydrogel polymer obtained by thermal polymerization by supplying hot air or heating the reactor may be discharged to a reactor outlet in the form of several centimeters to several millimeters depending on a shape of the agitation spindle provided in the reactor. Specifically, a size of the hydrogel polymer obtained may vary depending on the concentration and injection rate of the monomer composition to be injected, and a hydrogel polymer having a weight average particle diameter of 2 to 50 mm may be usually obtained.

In addition, when photopolymerization is performed in the reactor equipped with a movable conveyor belt as described above, a hydrogel polymer in the form of a sheet having a belt width may usually be obtained. At this time, a thickness of the polymer sheet may vary depending on the concentration and injection rate of the monomer composition to be injected, and it is preferable to supply the monomer composition so that the polymer in the form of a sheet has a thickness of about 0.5 to about 10 cm. When the monomer composition is supplied to such an extent that the thickness of the polymer sheet is too thin, the production efficiency may be low. When the thickness of the polymer sheet exceeds 10 cm, the polymerization reaction may not occur evenly over the entire thickness due to the excessively thick thickness.

Step 3

Subsequently, a step of drying and pulverizing the hydrogel polymer to form a powdery base resin is performed. If necessary, a coarse pulverization step may be further performed before drying to increase the efficiency of the drying step.

Herein, the pulverizing machine used is not particularly limited. Specifically, it may include at least one selected from the group consisting of a vertical pulverizer, a turbo cutter, a turbo grinder, a rotary cutter mill, a cutter mill, a disc mill, a shred crusher, a crusher, a chopper, and a disc cutter, but it is not limited thereto.

Gel pulverization of the hydrogel polymer may be performed such that the particle diameter of the hydrogel polymer is 0.01 mm to 50 mm, or 0.01 mm to 30 mm. That is, in order to increase drying efficiency, the hydrogel polymer is preferably pulverized into particles of 50 mm or less. However, since excessive pulverization may cause agglomeration between particles, it is preferable that the hydrogel polymer is gel pulverized into particles of 0.01 mm or more.

In addition, since the gel pulverization of the hydrogel polymer is performed in a state where the moisture content is relatively low, a phenomenon in which the hydrogel polymer adheres to the surface of the gel pulverizing machine may occur. In order to minimize this phenomenon, if necessary, steam, water, a surfactant, an anti-agglomeration agent (e.g., clay, silica, etc.), a persulfate-based initiator, an azo-based initiator, hydrogen peroxide, a thermal polymerization initiator, an epoxy-based cross-linking agent, a diol-based cross-linking agent, a cross-linking agent containing a polyfunctional acrylate of difunctional, trifunctional or higher, a monofunctional cross-linking agent containing a hydroxyl group, or the like may be added to the hydrogel polymer.

After the above-mentioned gel pulverization, the hydrogel polymer may be dried. The drying may be performed at a temperature of 120 to 250° C., preferably 140 to 200° C., and more preferably 150 to 200° C. In this case, the drying temperature may be defined as the temperature of the heating medium supplied for drying or the temperature inside the drying reactor including the heating medium and the polymer in the drying process. When the drying time is prolonged due to the low drying temperature, the process efficiency is lowered. In order to prevent this, the drying temperature is preferably 120° C. or higher. In addition, when the drying temperature is excessively high, the surface of the hydrogel polymer is excessively dried, which may increase the generation of fines in the subsequent pulverization step, thereby decreasing physical properties of the final polymer. In order to prevent this, the drying temperature is preferably 250° C. or lower.

Meanwhile, the drying time may be about 20 minutes to about 90 minutes in consideration of process efficiency, but is not limited thereto.

The drying method in the drying step is not particularly limited if it has been generally used in the drying process of the hydrogel polymer. Specifically, the drying step may be performed by the method of hot air provision, infrared radiation, microwave radiation, UV ray radiation, and the like. After the drying step, the moisture content of the polymer may be about 5 to about 10 wt %.

Subsequently, a step of pulverizing the dried polymer obtained through the drying step is performed.

The base resin, which is a polymer powder obtained after the pulverization step, may have a particle diameter of about 150 to about 850 μm. As the pulverizing machine used for pulverization to such a particle diameter, a pin mill, a hammer mill, a screw mill, a roll mill, a disc mill, a jog mill, or the like may be used, but the present disclosure is not limited thereto.

In order to manage the physical properties of the super absorbent polymer powder to be commercialized after the pulverization step, the base resin obtained after pulverization is classified according to particle size. Preferably, the polymer having a particle diameter of about 150 to about 850 μm is classified, and only the base resin having such a particle diameter may be subjected to a surface cross-linking reaction step.

Step 4

Meanwhile, after the base resin powder is prepared through the above-described classification process, super absorbent polymer particles may be formed by surface cross-linking while heat-treating the base resin powder in the presence of a surface cross-linking agent. The surface cross-linking induces a cross-linking reaction on the surface of the base resin powder in the presence of a surface cross-linking agent, and a surface modified layer (surface cross-linked layer) may be formed on the surface of the base resin powder through the surface cross-linking.

The content of the surface cross-linking agent may be appropriately selected depending on the type of the added surface cross-linking agent or reaction conditions, and about 0.001 to about 5 parts by weight may be used based on 100 parts by weight of the base resin. When the content of the surface cross-linking agent is too low, the surface modification may not be properly performed, and physical properties of the final polymer may be deteriorated. Conversely, when an excessive amount of the surface cross-linking agent is used, basic absorbency of the polymer may be rather deteriorated due to the excessive surface cross-linking reaction, which is not preferable.

In addition, the method of mixing the surface cross-linking agent with the base resin is not particularly limited. For example, a method of adding the surface cross-linking agent and the base resin powder in a reactor for mixing, a method of spraying the surface cross-linking agent onto the base resin powder, or a method of mixing the base resin and the surface cross-linking agent while continuously providing them to a continuously operating mixer may be used.

When adding the surface cross-linking agent, water may be mixed together and added in the form of a surface cross-linking solution. When water is added thereto, there is an advantage that the surface cross-linking agent may be evenly dispersed in the polymer. At this time, amounts of water to be added may be properly controlled for the purposes of inducing a uniform dispersion of the surface cross-linking agent, preventing an agglomeration phenomenon of the polymer powder, and optimizing a surface penetration depth of the surface cross-linking agent. For example, water may preferably be added in an amount of about 1 to about 10 parts by weight based on 100 parts by weight of the base resin.

In addition, the surface cross-linking step may be performed by further using at least one selected from the group consisting of polyvalent metal salts such as aluminum salts, more specifically, sulfate, potassium salt, ammonium salt, sodium salt and hydrochloride of aluminum in addition to the surface cross-linking agent.

As the polyvalent metal salt is additionally used, permeability of the super absorbent polymer prepared by the method of the embodiment can be further improved. The polyvalent metal salt may be added to the surface cross-linking solution together with the surface cross-linking agent, and may be used in an amount of 0.01 to 4 parts by weight based on 100 parts by weight of the base resin powder.

Meanwhile, the surface cross-linking process may be performed using a surface cross-linking solution containing water and/or a hydrophilic organic solvent (e.g., an alcohol-based polar organic solvent such as methanol) as a liquid medium together with the above-described surface cross-linking agent. At this time, amounts of water and the hydrophilic organic solvent to be added based on 100 parts by weight of the base resin powder may be properly controlled for the purposes of inducing a uniform dispersion of the surface cross-linking agent, preventing an agglomeration phenomenon of the base resin powder, and optimizing a surface penetration depth of the surface cross-linking agent.

The method of adding the surface cross-linking solution to the base resin powder is not particularly limited. For example, a method of adding the surface cross-linking solution and the base resin powder in a reactor for mixing, a method of spraying the surface cross-linking solution onto the base resin powder, or a method of mixing the base resin powder and the surface cross-linking solution while continuously providing them to a continuously operating mixer may be used.

Specifically, the surface cross-linking may be performed by heating the base resin powder to which the surface cross-linking solution is added to increase its temperature from an initial temperature of 20° C. to 130° C. to a maximum temperature of 140° C. to 200° C. over 10 minutes to 30 minutes, followed by heat-treatment while maintaining the maximum temperature for 5 minutes to 60 minutes. More specifically, the surface cross-linking may be performed by heat-treatment while maintaining a maximum temperature of 140° C. to 200° C., or 170° C. to 195° C. for 5 minutes to 60 minutes, or 10 minutes to 50 minutes.

When satisfying the surface cross-linking conditions (especially, the temperature increasing condition and the reaction condition at the maximum reaction temperature), a super absorbent polymer appropriately satisfying the physical properties of the embodiment can be more effectively prepared.

The heating means for the surface cross-linking reaction is not particularly limited. It is possible to provide a thermal media thereto or provide a heat source directly thereto. At this time, usable thermal media may be a heated fluid such as steam, hot air, hot oil, and the like, but the present invention is not limited thereto. Furthermore, the temperature of the thermal media provided thereto may be properly selected in consideration of the means of the thermal media, heating speed, and target temperature of heating. Meanwhile, an electric heater or a gas heater may be used as the heat source provided directly, but the present disclosure is not limited thereto. After the surface cross-linked layer is formed on the surface of the base resin as described above, an inorganic material may be further mixed therewith.

The inorganic material may be, for example, at least one selected from the group consisting of silica, clay, alumina, silica-alumina composite, and titania, and preferably silica.

The inorganic material may be used in an amount of 0.01 parts by weight or more, 0.05 parts by weight or more, or 0.1 parts by weight or more, and 5 parts by weight or less, 3 parts by weight or less, or 1 parts by weight or less based on 100 parts by weight of the super absorbent polymer.

The super absorbent polymer obtained according to the above-described preparation method maintains excellent absorption performance such as water retention capacity and absorbency under pressure, and satisfies an improved absorption rate, etc. Accordingly, it may satisfy various physical properties of the embodiment, and may be suitably used as a sanitary product such as a diaper, in particular, an ultra-thin sanitary product with a reduced pulp content.

PREPARATION EXAMPLES

The aqueous dispersion of hydrophobic particles used in the following Examples was prepared as follows.

Preparation Example 1: Preparation of Aqueous Dispersion of Calcium Stearate (Ca-st)

First, 50 g of water containing two or more surfactants (including polyoxyethylene alkyl ether-type nonionic surfactant and sulfate-type anionic surfactant) was added to a high shear mixer, and heated to 165° C., followed by adding 50 g of calcium stearate powder. Then, it was stirred for 30 minutes at 4000 rpm under normal pressure so that the calcium stearate could be sufficiently pulverized to obtain an aqueous dispersion in which 50 wt % of calcium stearate having an average particle diameter of 5 μm was dispersed. At this time, the pH of the aqueous dispersion was 9.5. In addition, the average particle diameter (D50) of the calcium stearate was measured/calculated using a laser diffraction particle size measuring device (Microtrac S3500) as the particle diameter at 50% of the cumulative distribution of the number of particles.

Preparation Example 2: Preparation of Aqueous Dispersion of Zinc Stearate (Zn-st)

First, 50 g of water containing two or more surfactants (including polyoxyethylene alkyl ether-type and fatty acid ester-type nonionic surfactants and sulfate-type anionic surfactant) was added to a high shear mixer, and heated to 140° C., followed by adding 50 g of zinc stearate powder. Then, it was stirred for 30 minutes at 4000 rpm under normal pressure so that the zinc stearate could be sufficiently pulverized to obtain an aqueous dispersion Zn-st in which 50 wt % of zinc stearate having an average particle diameter of 0.1 μm was dispersed. At this time, the pH of the aqueous dispersion was 9.5, and the average particle diameter (D50) of the zinc stearate was measured/calculated in the same manner as in Preparation Example 1.

Preparation Example 3: Preparation of Aqueous Dispersion of Hydrophobic Silica

First, 100 g of water was added to a high shear mixer, and hydrophobic silica having an average particle diameter of 0.3 μm and a water contact angle of 130° and hydrophobic silica having an average particle diameter of 3 μm and a water contact angle of 130° were slowly added thereto while stirring at 5000 rpm so as to be dispersed in an amount of 0.2 wt % and 2 wt % based on the total weight of the final aqueous dispersion, respectively. When the silica was completely added, the mixture was stirred at a temperature of 45° C. at 8000 rpm for 30 minutes. At this time, the pH of the aqueous dispersion was 9, and the average particle diameter (D50) of the hydrophobic silica was measured/calculated in the same manner as in Preparation Example 1.

Preparation Example 4: Preparation of Aqueous Dispersion of Hydrophobic Silica

An aqueous dispersion of hydrophobic silica was obtained in the same manner as in Preparation Example 3, except that hydrophobic silica having an average particle diameter of 0.3 μm and a water contact angle of 130° and hydrophobic silica having an average particle diameter of 3 μm and a water contact angle of 130° were added so as to be dispersed in an amount of 0.2 wt % and 4 wt % based on the total weight of the final aqueous dispersion, respectively.

Preparation Example 5: Preparation of Aqueous Dispersion of Hydrophobic Silica

An aqueous dispersion of hydrophobic silica was obtained in the same manner as in Preparation Example 3, except that only the hydrophobic silica having an average particle diameter of 0.3 μm and a water contact angle of 130° was added so as to be dispersed in an amount of 0.2 wt % based on the total weight of the final aqueous dispersion.

EXAMPLES

Example 1

A monomer solution was prepared by mixing 100 parts by weight of acrylic acid, 0.27 parts by weight of ethylene glycol diglycidyl ether, and 0.1 parts by weight of phenylbis (2,4,6-trimethylbenzoyl)phosphine oxide as a photoinitiator. Thereafter, while continuously supplying the monomer solution with a metering pump, 160 parts by weight of a 24 wt % sodium hydroxide aqueous solution were continuously added, and then 6 parts by weight of a 4 wt % sodium persulfate aqueous solution, 5 parts by weight of a 4 wt % sodium hydrogen carbonate aqueous solution, and 5 parts by weight of the aqueous dispersion of hydrophobic silica containing 0.2 wt % of hydrophobic silica having an average particle diameter of 0.3 μm and 2 wt % of hydrophobic silica having an average particle diameter of 3 μm prepared in Preparation Example 3 were high-speed line mixed to form a monomer composition. Through this transfer, the monomer composition was introduced into a polymerization reactor provided with a moving conveyor belt, and UV polymerization was performed for 3 minutes by irradiating ultraviolet rays using a UV irradiation device to prepare a sheet-type hydrogel polymer.

The hydrogel polymer was cut to have an average size of about 300 mm or less, and put into a pulverizing machine (provided with a porous plate including a plurality of holes having a diameter of 10 mm) to cut the hydrogel. Thereafter, the pulverized hydrogel was dried in an oven capable of changing wind direction up and down. The hydrogel was uniformly dried by flowing hot air at 180° C. so that the moisture content of the dried crumbs was about 2% or less. The dried polymer was pulverized with a pulverizing machine, followed by classification to prepare a base resin having a diameter of 150 to 850 μm.

Then, 6 parts by weight of a surface cross-linking aqueous solution containing 3 parts by weight of ethylene carbonate was sprayed to 100 parts by weight of the prepared base resin powder, and stirred at room temperature to evenly distribute the surface cross-linking solution on the base resin powder. Then, the base resin powder mixed with the surface cross-linking solution was placed in a surface cross-linking reactor, and a surface cross-linking reaction was performed.

In this surface cross-linking reactor, it was confirmed that the base resin powder was gradually heated from the initial temperature of around 80° C., and it was operated to reach the maximum reaction temperature of 190° C. after 30 minutes. After reaching the maximum reaction temperature, the reaction was further performed for 15 minutes, and a sample of the finally prepared super absorbent polymer was taken. After the surface cross-linking process, the super absorbent polymer of Example 1 having a particle diameter of 150 μm to 850 μm was prepared by classification with a ASTM standard mesh.

Example 2

A super absorbent polymer was prepared in the same manner as in Example 1, except that bubbles having a size of 10 to 300 μm were generated for 5 minutes using a bubble generator (OB-750S, manufactured by O2 Bubbles) instead of a carbonate-based foaming agent, and injected into the neutralization solution in Example 1; and 5 parts by weight of the aqueous dispersion of hydrophobic silica containing 0.2 wt % of the hydrophobic silica having an average particle diameter of 0.3 μm and 4 wt % of the hydrophobic silica having an average particle diameter of 3 μm prepared in Preparation Example 4 was used instead of the aqueous dispersion of hydrophobic silica prepared in Preparation Example 3.

Example 3

A super absorbent polymer was prepared in the same manner as in Example 1, except that the aqueous dispersion of hydrophobic silica prepared in Preparation Example 5 and the aqueous dispersion of calcium stearate prepared in Preparation Example 1 were used in Example 1 instead of the aqueous dispersion of hydrophobic silica prepared in Preparation Example 3 so that 0.01 parts by weight of hydrophobic silica and 0.1 parts by weight of calcium stearate were added based on 100 g of acrylic acid.

Example 4

A super absorbent polymer was prepared in the same manner as in Example 1, except that the aqueous dispersion of zinc stearate prepared in Preparation Example 2 and the aqueous dispersion of calcium stearate prepared in Preparation Example 1 were used in Example 1 instead of the aqueous dispersion of hydrophobic silica prepared in Preparation Example 3 so that 0.01 parts by weight of zinc stearate and 0.1 parts by weight of calcium stearate were added based on 100 g of acrylic acid.

Comparative Example 1

A super absorbent polymer was prepared in the same manner as in Example 1, except that neither the carbonate-based foaming agent nor the aqueous dispersion of hydrophobic particles was used in Example 1; and the hydrogel was cut to have an average size of about 300 mm or less, put into a pulverizing machine (provided with a porous plate including a plurality of holes having a diameter of 8 mm), and then pulverized under each condition.

Comparative Example 2

A super absorbent polymer was prepared in the same manner as in Example 1, except that 1 part by weight of a 3 wt % sodium dodecyl sulfate (SDS) solution was added instead of the aqueous dispersion of hydrophobic silica prepared in Preparation Example 3.

Comparative Example 3

A super absorbent polymer was prepared in the same manner as in Example 1, except that 7 parts by weight of 3 wt % aqueous dispersion of hydrophilic silica (Klebosol 20, manufactured by Merck) was added instead of the aqueous dispersion of hydrophobic silica prepared in Preparation Example 3.

Comparative Example 4

A super absorbent polymer was prepared in the same manner as in Example 1, except that 0.15 parts by weight of hydrophobic fumed silica (Reolosil® DM-30S, manufactured by Tokuyama) in the form of a powder was added instead of the aqueous dispersion of hydrophobic silica prepared in Preparation Example 3.

Comparative Example 5

A super absorbent polymer was prepared in the same manner as in Example 1, except that the aqueous dispersion of hydrophobic silica in which only hydrophobic silica having an average particle diameter of 0.3 μm was dispersed prepared in Preparation Example 5 was added instead of the aqueous dispersion of hydrophobic silica prepared in Preparation Example 3. At this time, the hydrophobic silica of Comparative Example 5 was added in the same weight as the total weight of the two types of hydrophobic particles of Example 1.

Comparative Example 6

A super absorbent polymer was prepared in the same manner as in Example 1, except that only the aqueous dispersion of calcium stearate prepared in Preparation Example 1 was added instead of the aqueous dispersion of hydrophobic silica prepared in Preparation Example 3. At this time, the calcium stearate of Comparative Example 6 was added in the same weight as the total weight of the two types of hydrophobic particles of Example 1.

Experimental Example 1: Measurement of Pore Size and Number of Particles of Super Absorbent Polymer In order to confirm the pore structure of the super absorbent polymers prepared in Examples and Comparative Examples, surface and internal images of the super absorbent polymer particles were measured using a scanning electron microscope (SEM). Thereafter, the number of pores capable of measuring the longest diameter per each super absorbent polymer was calculated from the measured images, and the average diameter and maximum diameter of pores were calculated based on the longest diameter of each pore for these 300 or more pores. Additionally, the average number of pores per particle was calculated from the number of pores for which the longest diameter was measured. In addition, pores having the longest diameter greater than or equal to, or less than or equal to the average diameter among these pores were classified with each other, and the number of pores having a diameter greater than or equal to the average diameter and the number of particles in which the corresponding pores were formed were measured. From this, a proportion of particles in which pores having a diameter greater than or equal to the average diameter and less than or equal to the maximum diameter was calculated.

At this time, the images of Example 3 and Comparative Example 2 among the measured SEM images are shown in FIGS. 1 and 2, respectively.

Referring to FIGS. 1 and 2, it was be confirmed in the super absorbent polymer of Example 3 that a plurality of pores having an average diameter of 1 to 100 μm and a maximum diameter of 280 to 300 μm were evenly formed, unlike in the super absorbent polymer of Comparative Example 2. In addition, it was confirmed that the super absorbent polymer of Example 3 had an average of 7 or more, for example, 7 to 30 pores per particle. And, in the super absorbent polymer of Example 3, the number of particles having pores having a diameter greater than or equal to the average diameter and less than or equal to the maximum diameter accounted for about 20 to 40% of the total number of super absorbent polymer particles.

In addition, although not shown in this disclosure, it was confirmed that the super absorbent polymers of Comparative Examples 3 and 4 did not have pores formed on the surface.

Experimental Example 2: Measurement of Physical Properties of Super Absorbent Polymer The physical properties of super absorbent polymers prepared in Examples and Comparative Examples were evaluated in the following manner, and are shown in Table 1 below. Unless otherwise indicated, all procedures were conducted in a constant temperature and humidity room (23±0.5° C., relative humidity of 45±0.5%). In order to prevent measurement errors, an average value of three measurements was taken as measurement data. In addition, physiological saline or saline used in the evaluation of the following physical properties means a 0.9 wt % sodium chloride (NaCl) aqueous solution.

(1) Centrifuge Retention Capacity (CRC)

The centrifuge retention capacity (CRC) by absorption ratio under a non-loading condition was measured according to the EDANA (European Disposables and Nonwovens Association, EDANA) WSP 241.3. After inserting $W_0$ (g, about 0.2 g) of the super absorbent polymer uniformly in a nonwoven fabric envelope and sealing the same, it was soaked in saline (0.9 wt % aqueous solution of sodium chloride) at room temperature. After 30 minutes, the envelope was centrifuged at 250 G for 3 minutes to drain, and the weight $W_2$ (g) of the envelope was measured. Further, after carrying out the same operation without using the super absorbent polymer, the weight $W_1$ (g) of the envelope was measured. Then, CRC (g/g) was calculated by using the obtained weight values according to the following Equation 1.

$$CRC(g/g)=\{[W_2(g)-W_1(g)-W_0(g)]/W_0(g)\} \quad \text{[Equation 1]}$$

(2) Absorbency Under Pressure (AUP)

The absorbency under pressure (AUP) was measured according to the EDANA (European Disposables and Nonwovens Association) WSP 242.3.

First, a 400 mesh stainless steel screen was installed in a cylindrical bottom of a plastic having an inner diameter of 60 mm. $W_0$ (g, 0.90 g) of the polymer prepared in one of Examples 1 to 6 and Comparative Examples 1 to 4 was uniformly scattered on the screen at a temperature of 23±2° C. and a relative humidity of 45%. Thereafter, a piston which can uniformly provide a load of 4.83 kPa (0.7 psi) was placed thereon. Herein, the outer diameter of the piston was slightly smaller than 60 mm, there was no gap with the inner wall of the cylinder, and jig-jog of the cylinder was not interrupted. At this time, the weight $W_3$ (g) of the device was measured.

Subsequently, a glass filter having a diameter of 125 mm and a thickness of 5 mm was placed in a petri dish having a diameter of 150 mm, and saline (0.9 wt % sodium chloride) was poured in the dish. At this time, the saline was poured until the surface level of the saline became equal to the upper surface of the glass filter. The measuring device was placed on the glass filter, and the liquid was absorbed for 1 hour under a load. After 1 hour, the measuring device was lifted, and the weight $W_4$ (g) was measured.

Then, AUP (g/g) was calculated by using the obtained weight values according to the following Equation 2.

$$AUP(g/g)=[W_4(g)-W_3(g)]/W_0(g) \quad \text{[Equation 2]}$$

in Equation 2, $W_0$ (g) is an initial weight (g) of the super absorbent polymer, $W_3$ (g) is a sum of a weight of the super absorbent polymer and a weight of the device providing a load to the super absorbent polymer, and $W_4$ (g) is a sum of a weight of the super absorbent polymer and a weight of the device providing a load to the super absorbent polymer, after making the super absorbent polymer absorb the saline for 1 hour under a load (0.7 psi).

(3) Vortex Time (Absorption Rate)

The vortex time (absorption rate) of the super absorbent polymers of Examples and Comparative Examples was measured in the following manner.

- (①) First, 50 mL of 0.9% saline was added to a 100 mL beaker with a flat bottom using a 100 mL Mass Cylinder.
- (②) Next, after placing the beaker in the center of a magnetic stirrer, a circular magnetic bar (30 mm in diameter) was put in the beaker.
- (③) Thereafter, the stirrer was operated such that the magnetic bar stirred at 600 rpm, and the lowermost part of vortex generated by the stirring was made to reach the top of the magnetic bar.
- (④) After confirming that the temperature of the saline in the beaker reached 24.0° C., 2±0.01 g of a super absorbent polymer sample was added and a stopwatch was operated at the same time. Then, the time taken until the vortex disappeared and a surface of liquid became completely horizontal was measured in seconds, and this was taken as the vortex time.

(4) Surface Tension (S/T)

The surface tension of the super absorbent polymers of Examples and Comparative Examples was measured as follows.

① First, 40 g of saline composed of 0.9 wt % sodium chloride was placed in a 50 ml beaker, a circular magnetic bar (30 mm in diameter) was placed therein, and stirred at 350 rpm for 3 minutes.

② Subsequently, 0.5 g of the super absorbent polymer was added to the stirring solution, stirred for an additional 3 minutes, and then allowed to stand for 2 minutes so that the swollen super absorbent polymer settled on the bottom.

③ Thereafter, the supernatant (the solution immediately below the surface) was extracted with a pipette, and transferred to another clean cup to measure the surface tension using a surface tension meter (Force Tensiometer-K11/K100, manufactured by Kruss).

deterioration in absorption performance compared to the super absorbent polymers of Comparative Examples.

Specifically, it could be seen that the super absorbent polymers of Examples exhibited a significantly improved absorption rate compared to Comparative Example 1 in which the foaming agent and the foam stabilizer were not used. In addition, it could be seen that the super absorbent polymers of Examples had a faster absorption rate with a higher surface tension compared to Comparative Example 2 using sodium dodecyl sulfate (SDS), which is mainly used as a conventional foam stabilizer.

In addition, it was confirmed that the super absorbent polymer of Examples had a developed porous structure in which a large number of micropores having uniform diameters are formed, thereby exhibiting a fast absorption rate, compared to the super absorbent polymer of Comparative Example 5 using only the aqueous dispersion of hydrophobic silica having an average particle diameter of less than 1 μm and the super absorbent polymer of Comparative Example 6 using only the aqueous dispersion of hydrophobic silica having an average particle diameter of more than 1 μm.

TABLE 1

| | | Type of foam stabilizer | | Pore structure of super absorbent polymer | | | | Properties of super absorbent polymer | | | |
|---|---|---|---|---|---|---|---|---|---|---|---|
| | | First hydrophobic particles (avg. particle diameter, μm) | Second hydrophobic particles (avg. particle diameter, μm) | Avg. diameter (μm) | Max. diameter (μm) | Avg. pores per particle (the number of pores) | Proportion of particles having pores above avg. diameter (%) | CRC (g/g) | AUP (g/g) | Vortex time (sec) | S/T (mN/m) |
| | Foaming | | | | | | | | | | |
| Example 1 | SBC | hydrophobic silica (0.3) | hydrophobic silica (3) | 100 | 300 | 7 | 27 | 29.1 | 25.2 | 37 | 68 |
| Example 2 | Bubble generator | hydrophobic silica (0.3) | hydrophobic silica (3) | 58 | 257 | 26 | 15 | 29.8 | 24.0 | 23 | 69 |
| Example 3 | SBC | hydrophobic silica (0.3) | Ca-st (5) | 77 | 280 | 13 | 32 | 29.4 | 25.0 | 28 | 67 |
| Example 4 | SBC | Zn-st (0.1) | Ca-st (5) | 82 | 294 | 9 | 47 | 28.3 | 24.7 | 32 | 67 |
| Comparative Example 1 | — | — | — | 80 | 200 | 0 | — | 27.0 | 24.0 | 60 | 70 |
| Comparative Example 2 | SBC | SDS | | 314 | 650 | 2 | 100 | 27.5 | 24.8 | 47 | 58 |
| Comparative Example 3 | SBC | hydrophilic silica | | — | — | 0 | — | 26.8 | 24.1 | 78 | 70 |
| Comparative Example 4 | SBC | hydrophobic silica powder | | — | — | 0 | — | 27.0 | 24.5 | 75 | 69 |
| Comparative Example 5 | SBC | hydrophobic silica (0.3) | | 276 | 587 | 3 | 82 | 28.0 | 24.6 | 52 | 67 |
| Comparative Example 6 | SBC | Ca-st (5) | | 184 | 522 | 5 | 75 | 28.2 | 25.0 | 45 | 67 |

As shown in Table 1, it was confirmed that the super absorbent polymers of Examples in which the polymerization reaction of the monomers was performed in the presence of an aqueous dispersion containing two types of hydrophobic particles had a pore structure in which an average of 7 or more pores per particle were included, unlike the super absorbent polymers of Comparative Examples, wherein the pores have an average diameter of 100 μm or less and a maximum diameter of 300 μm or less. In addition, the proportion of particles having pores having a diameter greater than or equal to the average diameter was about 10 to 50%, and it was confirmed that micropores having a diameter close to the average diameter were formed very uniformly on the remaining majority of the particles.

In addition, it was confirmed that the super absorbent polymers of Examples exhibited a surface tension of a certain level or more and a fast absorption rate without In particular, it was confirmed in the super absorbent polymer of Comparative Example 3 using the aqueous dispersion of hydrophilic silica and the super absorbent polymer of Comparative Example 4 using the hydrophobic silica in the form of powder that the absorption rate could not be improved because pore structures could not be formed on the surface.

The invention claimed is:

1. A super absorbent polymer, comprising
 a powder-type base resin comprising a cross-linked polymer of an acrylic acid-based monomer having at least partially neutralized acidic groups and an internal cross-linking agent; and
 a surface cross-linked layer formed by further cross-linking the cross-linked polymer using a surface cross-linking agent on the powder-type base resin, wherein the super absorbent polymer is in the form of particles and has an average of 7 or more pores per particle, a plurality of pores have an average diameter of 100 μm or less and a maximum diameter of 300 μm or less, and the number of particles having pores having a diameter greater than or equal to the average diameter and less than or equal to the maximum diameter accounts for 10 to 50% of the total number of super absorbent polymer particles, and the super absorbent polymer has a surface tension of 65 mN/m or more and a vortex time at 24.0° C. of 40 seconds or less.

2. The super absorbent polymer of claim 1,
wherein the super absorbent polymer comprises first hydrophobic particles and second hydrophobic particles,
the first hydrophobic particles have an average particle diameter of less than 1 μm, and
the second hydrophobic particles have an average particle diameter of 1 μm or more.

3. The super absorbent polymer of claim 2,
wherein a ratio of the average particle diameter of the second hydrophobic particles to the average particle diameter of the first hydrophobic particles is 5 to 100.

4. The super absorbent polymer of claim 2,
wherein the first hydrophobic particles and the second hydrophobic particles are included in a weight ratio of 1:5 to 1:50.

5. The super absorbent polymer of claim 2,
wherein the first hydrophobic particles and the second hydrophobic particles are each independently selected from the group consisting of hydrophobic silica, a metal salt of a C7 to C24 fatty acid, and hydrophobic organic particles.

6. The super absorbent polymer of claim 5,
wherein the metal salt of the fatty acid is at least one metal salt of stearic acid selected from the group consisting of calcium stearate, magnesium stearate, sodium stearate, zinc stearate and potassium stearate.

7. The super absorbent polymer of claim 1,
wherein the super absorbent polymer has an average of 7 to 30 pores per particle.

8. The super absorbent polymer of claim 1,
wherein the surface cross-linking agent comprises at least one selected from a polyalcohol-based compound, a polyepoxy-based compound, a polyamine compound, a haloepoxy compound, a condensation product of a haloepoxy compound, an oxazoline-based compound, or an alkylene carbonate-based compound.

9. The super absorbent polymer of claim 1,
which has a centrifuge retention capacity (CRC) measured according to EDANA WSP 241.3 of more than 27 g/g, and an absorbency under pressure (AUP) at 0.7 psi measured according to EDANA WSP 242.3 of more than 20 g/g.

10. A method for preparing a super absorbent polymer, comprising the steps of:
step 1: preparing a monomer composition containing an acrylic acid-based monomer having at least partially neutralized acidic groups, a polymerization initiator, an internal cross-linking agent, and an aqueous dispersion of hydrophobic particles;
step 2: preparing a hydrogel polymer by cross-linking polymerization of the monomer composition in the presence of a foaming agent or a bubble generator;
step 3: forming a powder-type base resin by drying and pulverizing the hydrogel polymer; and
step 4: forming a surface cross-linked layer by further cross-linking the surface of the powder-type base resin in the presence of a surface cross-linking agent,
wherein the aqueous dispersion of hydrophobic particles is a colloidal solution in which first hydrophobic particles and second hydrophobic particles are dispersed, and a ratio of an average particle diameter of the second hydrophobic particles to an average particle diameter of the first hydrophobic particles is 5 to 100.

11. The method for preparing a super absorbent polymer of claim 10,
wherein the first hydrophobic particles have an average particle diameter of less than 1 μm, and
the second hydrophobic particles have an average particle diameter of 1 μm or more.

12. The method for preparing a super absorbent polymer of claim 10,
wherein each of the first hydrophobic particles and the second hydrophobic particles is used in an amount of 50 ppmw or more and 1 parts by weight or less based on 100 parts by weight of the acrylic acid-based monomer.

13. The method for preparing a super absorbent polymer of claim 10,
wherein a total weight of the first hydrophobic particles and the second hydrophobic particles is 0.01 to 2 parts by weight based on 100 parts by weight of the acrylic acid-based monomer.

14. The method for preparing a super absorbent polymer of claim 10,
wherein the first and second hydrophobic particles are dispersed in the aqueous dispersion of hydrophobic particles in the presence of at least a surfactant selected from a nonionic surfactant and or an anionic surfactant.

15. The method for preparing a super absorbent polymer of claim 10,
wherein the surface cross-linking agent comprises at least one selected from a polyalcohol-based compound, a polyepoxy-based compound, a polyamine compound, a haloepoxy compound, a condensation product of a haloepoxy compound, an oxazoline-based compound, or an alkylene carbonate-based compound.

16. The method for preparing a super absorbent polymer of claim 10,
wherein the surface cross-linking is performed by increasing temperature from an initial temperature of 20° C. to 130° C. to a maximum temperature of 140° C. to 200° C. over 10 minutes to 30 minutes, followed by heat-treatment while maintaining the maximum temperature for 5 minutes to 60 minutes.

17. The method for preparing a super absorbent polymer of claim 10,
wherein the acrylic acid-based monomer is included in an amount of about 20 to 60 wt % based on a total weight of the monomer composition.

18. The method for preparing a super absorbent polymer of claim 10,
wherein the hydrophobic particles are included in the aqueous dispersion in an amount of 0.01 to 60 wt % based on a total weight of the aqueous dispersion.

19. The method for preparing a super absorbent polymer of claim 10,
wherein the foaming agent is at least one selected from the group consisting of sodium bicarbonate, sodium carbonate, potassium bicarbonate, potassium carbonate, calcium bicarbonate, calcium carbonate, magnesium bicarbonate and magnesium carbonate.

20. The method for preparing a super absorbent polymer of claim 19,
wherein the foaming agent is included in an amount of 50 ppmw or more and 1 part by weight or less based on 100 parts by weight of the acrylic acid-based monomer.

* * * * *